(No Model.)
E. A. SPERRY.
ELECTRIC CONTROLLER.
No. 571,410. Patented Nov. 17, 1896.
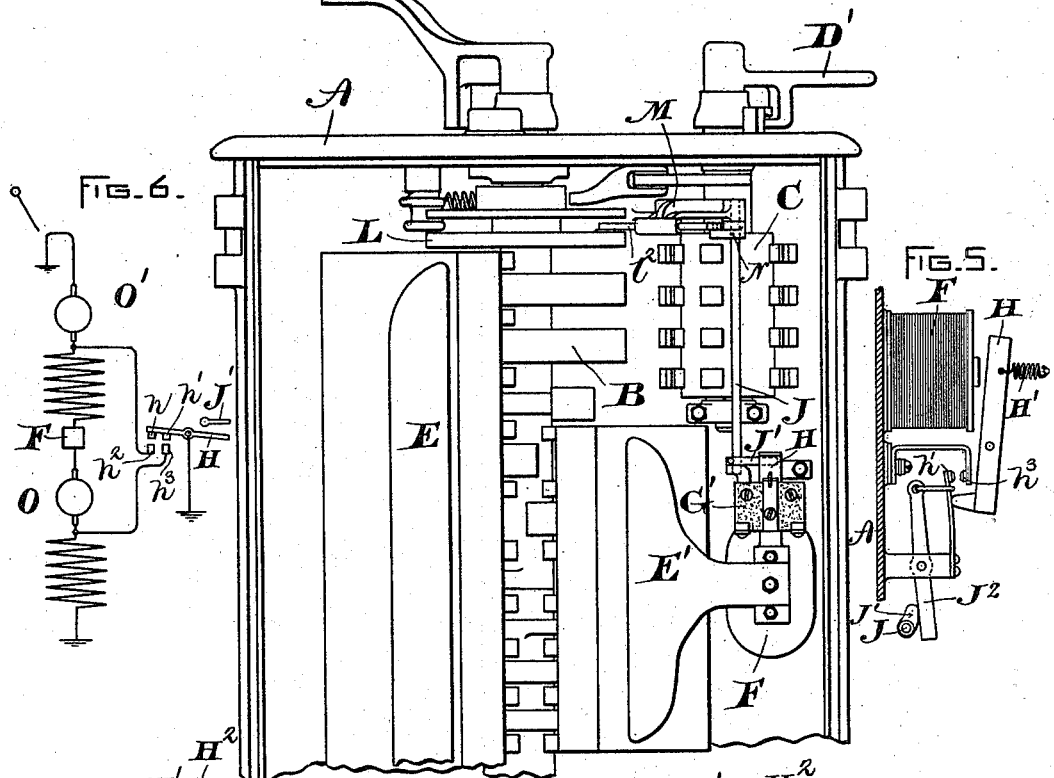
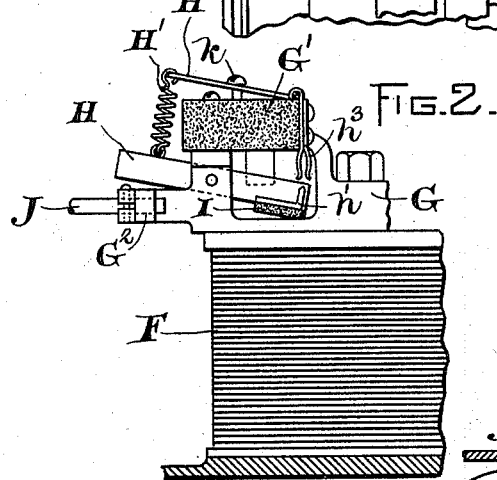
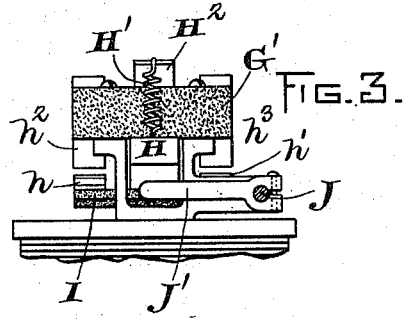
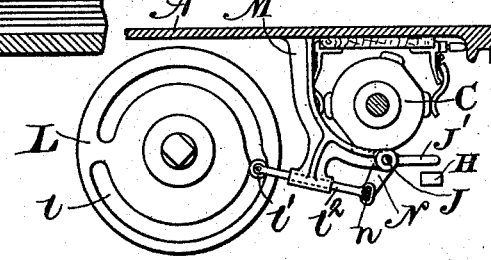
WITNESSES:
A. H. Abell.
A. F. Macdonald.
INVENTOR.
Oliver A. Sperry,
by Geo. B. Blodgett,
Atty.

UNITED STATES PATENT OFFICE.

ELMER A. SPERRY, OF CLEVELAND, OHIO, ASSIGNOR TO THE GENERAL ELECTRIC COMPANY, OF NEW YORK.

ELECTRIC CONTROLLER.

SPECIFICATION forming part of Letters Patent No. 571,410, dated November 17, 1896.

Application filed July 31, 1896. Serial No. 601,148. (No model.)

*To all whom it may concern:*

Be it known that I, ELMER A. SPERRY, a citizen of the United States, residing at Cleveland, in the county of Cuyahoga, State of Ohio, have invented certain new and useful Improvements in Electric Controllers, (Case No. 328,) of which the following is a specification.

The present invention relates to electric controllers which are employed for regulating the power supplied to dynamo-electric machines when used for propelling a vehicle and for regulating the energy supplied to brake-magnets when the machines are acting as generators and supplying current for braking purposes. In connection with controllers of this class it has been found necessary to provide means for limiting the amount of current generated by the dynamo-electric machine or machines when acting as generators, as the amount of current generated in the rapidly-revolving armature of a dynamo-electric machine is in excess of the amount required for braking purposes, and when the resistance of the brake-circuit is adjusted for a given current it will readily be seen that if under certain conditions the machine generates more than this amount the resistance will be inadequate to keep down the current used for braking purposes.

In my pending application, Serial No. 539,019, filed February 19, 1895, I have shown and described a switch for limiting the current generated by a dynamo-electric machine when used for braking purposes, and it is broadly claimed in that application. The present application relates to the construction and arrangement of such a switch.

In providing means for limiting the current generated by the dynamo-electric machines when used for braking purposes it has been found that the most practical way is to momentarily shunt the fields with a low resistance. This kills the fields, but before they have a chance to die out the limit-switch controlling the resistance opens and the circuit is reëstablished as before, this being repeated each time the current rises to a predetermined amount, and as a result the current remains practically constant so long as the momentum of the vehicle is maintained.

It sometimes occurs that the vehicle is traveling at a high rate of speed, and the motorman interrupts the power-circuit and momentarily applies the brakes. The current generated by the machines will be great enough to instantly close the limit-switch, and if the brakes are immediately cut out of circuit and the power-circuit reëstablished it often happens that the limit-switch fails to open, due to imperfections. This will result in a short-circuit of the field-magnets, which will burn out the limit-switch and destroy its further operation.

It is to overcome the objections above pointed out that this invention has for one of its objects. This is accomplished by providing means actuated by the main controller-handle for positively opening the circuit of the limit-switch before the power is supplied to the dynamo-electric machines.

The invention further has for its object to reduce the amount of wiring to a minimum, and this is accomplished by inclosing the limit-switch in the same case with the controller instead of placing it in a separate box, as is the case with other constructions with which I am familiar.

A further object of the invention is to dispense with the usual switch-actuating coil and to utilize for this purpose the energizing-coil of a blow-out magnet.

The invention is designed to be applied to a well-known type of controller. This is accomplished by mounting a structure comprising an armature and contacts on the core of a magnet which is adapted to blow out the arcs formed at the breaking of the circuit on one side of the system. The armature is so arranged that it is attracted as the current in the brake-circuit increases, and closes a shunt-circuit around the field-coils when the current reaches a predetermined amount. To insure the opening of this circuit at the proper time, a cam is mounted on the main cylinder, and as it reciprocates between the brake and the power side it actuates a small lever engaging with the armature of the limit-switch and opens the shunt-circuit.

The armature in a switch of this kind has a tendency to act sluggishly, so instead of having the lever engage with the armature it may be arranged to open the contacts, a spring being utilized to actuate the armature when the magnetism ceases.

In the accompanying drawings, attached to and made part of this specification, Figure 1 is a partial front elevation of a controller with the cover removed. Fig. 2 is a detail of the blow-out magnet and switch. Fig. 3 is a side view of the switch. Fig. 4 is a plan view of the cam and operating-lever. Fig. 5 is a modification in which the contact is positively actuated instead of the armature, and Fig. 6 is a diagram of connections.

A represents the inclosing case of the controller; B, the commutating-cylinder; C, the reversing-switch; D and D', the operating-handles of the commutating and reversing switches, respectively.

E is the pole-piece of the blow-out magnet for disrupting the arcs formed on the power side of the system, and E' is the pole-piece of the magnet F, which is adapted to blow out the arcs formed on the brake side of the system. Mounted on the core of the blow-out magnet F is a casting G, supporting the insulation G'.

The armature H is pivoted at or near its center of gravity to reduce the vibration due to the jolting of the vehicle. This is provided with contacts $h\ h'$, mounted on the insulating-piece I. Extending outward from the casting G is a projection forming a bearing $G^2$ for the rod J. Mounted on the rod J and adapted to engage with the armature H is an arm J'. This operates, when moved in the proper direction, to aid the spring H' in opening the circuit between the contacts $h\ h^2$ and $h'\ h^3$.

The spring H' is secured in any desired manner to the armature H, and the other end is secured to the plate-spring $H^2$, which in turn is secured to the insulating-piece G' and is provided with a screw $k$ for limiting its upward movement. The stationary contacts $h^2$ and $h^3$ are made of copper and have a certain amount of spring to enable them to make good contact with the moving contacts $h$ and $h'$.

Fig. 4 shows a plan view of the disk L, which is mounted on the main actuating-shaft of the controller and is provided with a cam-groove $l$, in which the roller $l'$ travels. Extending outward from the back of the controller-casing is a lug M, forming a bearing for the rod $l^2$, which is secured to the roller $l'$. The outer end of the rod $l^2$ is made in the form of a loop, and traveling in it is a pin $n$, which is secured to the arm N. The lug M also furnishes a bearing for the upper end of the rod J, and mounted on this rod near the bearing is the arm N, which causes the rod J to reciprocate as the rod $l^2$ moves back and forth due to the action of the cam-groove $l$ and the roller $l'$.

Fig. 5 shows a modification in which the armature H is attracted by means of the coil F, but instead of mounting the contacts $h$ and $h'$ thereon they are carried by a separate structure. This construction is desirable in case the armature does not respond readily to the action of the arm J', as would be the case where the magnetism of the core and armature slowly decreases. When the arm J' is moved, it engages with the lever $J^2$ and the contact $h'$ is pulled away from the stationary contact $h^3$. This positively insures the opening of the circuit, and the armature H will be returned to the position shown by means of the spring H'.

As the controller-circuits form no part of the present invention, they are omitted. By referring to Fig. 6 the relation of the machines and the limit-switch will be seen. The coil F is included in circuit in such manner that as the current in the circuit increases to a predetermined amount the outer end of the armature H, Fig. 2, is pulled down by reason of the magnetic lines of force tending to establish as short a circuit as possible. This completes the circuit between the movable contacts $h$ and $h'$ and the stationary contacts $h^2$ $h^3$ and momentarily the fields of the motors O O' are shunted. This shunt is opened, however, as soon as the current flowing in the circuit falls below the predetermined amount, the spring H' acting to open the circuit by raising the armature.

If for any reason the armature H remains in the closed position after the brake-circuit is broken, the arm J' will engage with the end of the armature or contact and open the circuit, the arm being actuated by the cam L, which is so adjusted with respect to the contacts of the power-circuit that it will actuate the arm prior to the closing of the power-circuit.

The present application has been described in connection with brake-magnets, but there is nothing in the invention to limit it to this. Any brake system in which dynamo-electric machines are used for propelling and braking purposes can be used in connection with the invention.

What I claim as new, and desire to secure by Letters Patent of the United States, is—

1. In an electric-brake system, the combination of dynamo-electric machines used for propelling and braking purposes, a switch for limiting the current when the machines are acting as generators and braking the car, and means for insuring the opening of the limit-switch at a predetermined time.

2. In an electric-brake system, the combination of dynamo-electric machines used for propelling and braking purposes, a switch for limiting the current when the machines are acting as generators and braking the car, and means actuated by the controller-handle for positively opening the limit-switch, before the power-circuit is closed.

3. In an electric-brake system, the combination of dynamo-electric machines used for propelling and braking purposes, a contact-cylinder for controlling the circuits of the machines, a cam carried by the shaft of the cylinder, and means operated by the cam for opening the limit-switch before the power-circuit is closed.

4. In a controller, the combination of an inclosing case, a contact-cylinder, a limit-switch mounted within the case, a magnet for closing the limit-switch, and means actuated by the controller-handle for opening the limit-switch before the power-circuit is closed.

5. In a controller, the combination of a contact-cylinder, a limit-switch mounted on the core of a magnet, an arm for opening the switch, and a cam actuated by a movement of the controller-handle for operating the arm.

6. In a controller, the combination of a contact-cylinder adapted to establish certain relations of the brake-circuit, a blow-out magnet included in the brake-circuit, and a limit-switch for limiting the current generated by the dynamo-electric machines, when used for braking purposes, actuated by the current flowing in the coil of the blow-out magnet.

7. In a controller, the combination of a contact-cylinder adapted to establish certain relations of the power and brake circuits, a blow-out magnet included in the brake-circuit, a limit-switch mounted on the core of the magnet, contacts carried by the armature of the switch adapted to close a circuit for limiting the power of the generators, and an arm for positively actuating the switch at a predetermined time.

8. In a limit-switch, the combination of an armature pivoted at its center of gravity, contacts carried by the armature, stationary contacts mounted on a support and adapted to engage with the armature-contacts, a magnet for operating the armature, and an arm positively actuated for insuring the opening of the circuit.

In witness whereof I have hereunto set my hand this 28th day of July, 1896.

ELMER A. SPERRY.

Witnesses:
A. F. MACDONALD,
WILLIAM J. FUEHRER.